United States Patent
Burzio

(10) Patent No.: US 8,146,412 B2
(45) Date of Patent: Apr. 3, 2012

(54) MODEL AT A REDUCED SCALE OF A TIRE FOR AERODYNAMIC TESTS IN A WIND TUNNEL

(75) Inventor: Matteo Burzio, Fiorano Modenese (IT)

(73) Assignee: Ferrari S.p.A., Modena (IT)

( * ) Notice: Subject to any disclaimer, the term of this patent is extended or adjusted under 35 U.S.C. 154(b) by 513 days.

(21) Appl. No.: 12/225,475

(22) PCT Filed: Mar. 23, 2007

(86) PCT No.: PCT/EP2007/052831
§ 371 (c)(1),
(2), (4) Date: Apr. 14, 2009

(87) PCT Pub. No.: WO2007/107608
PCT Pub. Date: Sep. 27, 2007

(65) Prior Publication Data
US 2010/0015377 A1     Jan. 21, 2010

(30) Foreign Application Priority Data
Mar. 23, 2006 (EP) .................................. 06425196

(51) Int. Cl.
*G01M 17/02* (2006.01)

(52) U.S. Cl. ............................................. 73/146; 73/147
(58) Field of Classification Search .................... 73/146, 73/147
See application file for complete search history.

(56) References Cited

U.S. PATENT DOCUMENTS

| 6,725,168 | B2 * | 4/2004 | Shiraishi et al. | 702/81 |
| 6,761,060 | B2 * | 7/2004 | Mancosu et al. | 73/146 |
| 7,415,871 | B2 * | 8/2008 | Shiraishi | 73/146 |
| 7,434,456 | B2 * | 10/2008 | Shiraishi | 73/146 |

OTHER PUBLICATIONS

Miller L.S., Aerodynamic Effects of Oversized Tires and Modified Landing Gear on a Small Utility Airplane, Jun. 2000, US Department of Transportation, pp. 1-22.*

* cited by examiner

*Primary Examiner* — Freddie Kirkland, III
(74) *Attorney, Agent, or Firm* — Davidson, Berquist, Jackson & Gowdey, LLP

(57) ABSTRACT

A reduced scale model of a tire for aerodynamic tests in a wind tunnel, the model having a hollow toroidal shape, is made of a single molded plastic material homogeneous throughout the model, is deformable, and is shaped so as to reproduce externally the deformed shape of the tire under load when this is set in conditions of operation under the action of centrifugal loads and/or ground loads.

17 Claims, 2 Drawing Sheets

MODEL AT A REDUCED SCALE OF A TIRE FOR AERODYNAMIC TESTS IN A WIND TUNNEL

TECHNICAL FIELD

The present invention relates to a model at a reduced scale of a tyre for aerodynamic tests in a wind tunnel.

BACKGROUND ART

In the development of the external shape of a road vehicle there are normally conducted a series of aerodynamic tests in a wind tunnel to verify the effective aerodynamic behaviour of the road vehicle itself. To carry out aerodynamic tests on a prototype of a road vehicle in a wind tunnel a model at a reduced scale of the prototype of the road vehicle is normally used both in order to contain the costs and the complexity linked to the wind tunnel and in order to reduce the costs of production of the prototype of the road vehicle used for the tests. Furthermore, on account of inevitable technological limits, some measurements in a wind tunnel are more precise when they are performed using a model at a reduced scale of the prototype of the road vehicle.

In the case of an automobile, very frequently a model in scale 1:2 is used, in so far as this ratio of reduction enables an excellent balance to be obtained between the needs of containing the costs and the need for precision and reliability of the measurements. A critical component of a model in scale 1:2 of an automobile for aerodynamic tests in a wind tunnel is represented by the tyres, in so far as, whereas all the other parts of the model are static and undeformable in use, the tyres of the model must turn at a variable speed directly proportional to the speed of the wind and at the same time must deform underneath in the area of contact with the road surface reproducing as faithfully as possible the deformations of a real tyre.

Currently, a model in scale 1:2 of a tyre for aerodynamic tests in a wind tunnel is provided with constructional modalities that are altogether similar to the constructional modalities of a real tyre, and hence the model in scale 1:2 of a tyre must be mounted on a rim, must be inflated and is made up of by a series of combined materials that are different from one another: one type of rubber for the tread, another type of rubber for the carcass, the metal wires for the plies, the metal for the bead wires, the metal wires for the bead, etc.

However, the construction of a model in scale 1:2 of a tyre for aerodynamic tests in a wind tunnel according to the modalities described above is extremely complex and costly, in so far as it requires complicated simulations and sizing operations to be carried out in order to obtain a model that will have at a reduced scale a behaviour similar to that of a real tyre. Consequently, the construction of a realistic and accurate model in scale 1:2 of a tyre for aerodynamic tests in a wind tunnel is reserved only to the design of a limited number of competition cars with high technological content (for example, Formula-1 cars). In addition, also in said cases of competition cars with high technological content it is normally possible to prepare just a small number of models in scale 1:2 of tyres, and hence it is not possible to have for each type of tyre that can potentially be used in a race a corresponding model in scale 1:2.

DISCLOSURE OF THE INVENTION

The aim of the present invention is to provide a model at a reduced scale of a tyre for aerodynamic tests in a wind tunnel, said model at a reduced scale being free from the drawbacks described above and being simple and economically advantageous.

In accordance with the present invention a model at a reduced scale of a tyre for aerodynamic tests in a wind tunnel is provided according to what is recited in the annexed claims.

BRIEF DESCRIPTION OF THE DRAWINGS

The present invention will now be described with reference to the annexed plate of drawings, which illustrates a non-limiting example of embodiment thereof and in which.

BEST MODE FOR CARRYING OUT THE INVENTION

Figure 1:
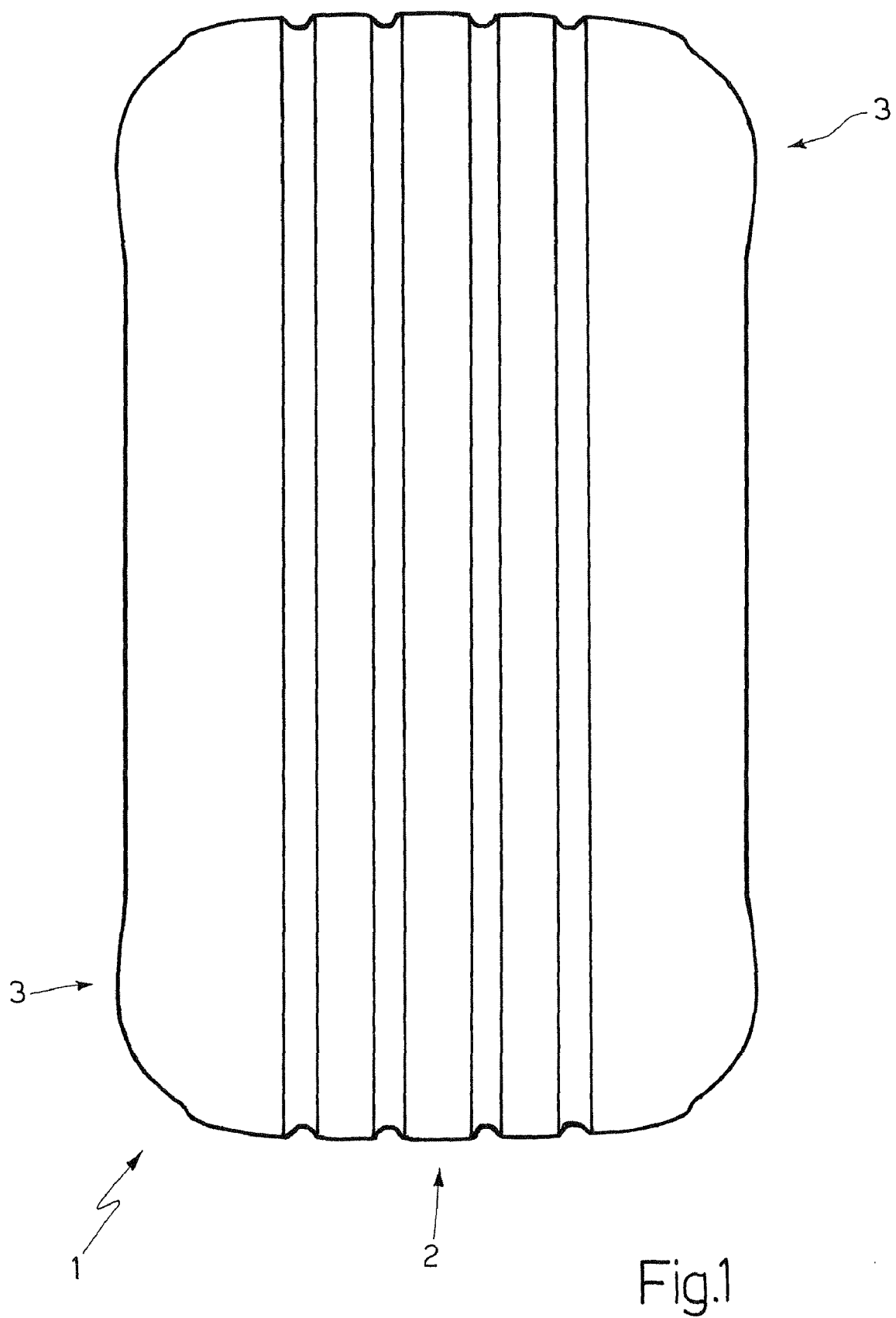
FIG. 1 is a schematic front view of a model at a reduced scale of a tyre for aerodynamic tests in a wind tunnel made in accordance with the present invention.

With reference to the attached plate of drawings, the reference number 1 designates, as a whole, a model at a reduced scale, in particular at a scale 1:2, of a tyre for aerodynamic tests in a wind tunnel. In a wind tunnel, the model 1 is set in rotation at a velocity of rotation proportional to the speed of the wind by means of an underlying band belt and is loaded vertically; consequently, in use, i.e., in conditions of operation, the model 1 is subjected to the effect of centrifugal loads and to the effect of ground loads.

The model 1 has a hollow toroidal shape and is made of a single plastic material, which is moulded and is homogeneous throughout the model 1; in other words, the entire model 1 is made of a single plastic material that is homogeneous, i.e., one that has in all the parts of the model 1 one and the same uniform density and hence the same mechanical characteristics.

The model 1 is deformable (i.e., it is not rigid) and is shaped so as to reproduce externally the deformed shape under load of the tyre to be reproduced, when this is set in conditions of operation under the action of centrifugal loads and/or ground loads. In other words, the shape of the model 1 in static conditions is generally different from the shape of the tyre to be reproduced in static conditions, whilst the deformations that arise in the model 1 in conditions of operation under the action of centrifugal loads and/or ground loads cause the model 1 to assume the deformed shape under load of the tyre to be reproduced.

Preferably, in use, the model 1 is not inflated. However, the model 1 could be studied also to be inflated in use.

The model 1 presents an annular portion 2 representing the tread of the tyre to be imitated and two disk-shaped portions 3, which are arranged perpendicular and on opposite sides with respect to the cylindrical portion and represent the sides of the tyre to be imitated.

Figure 2:
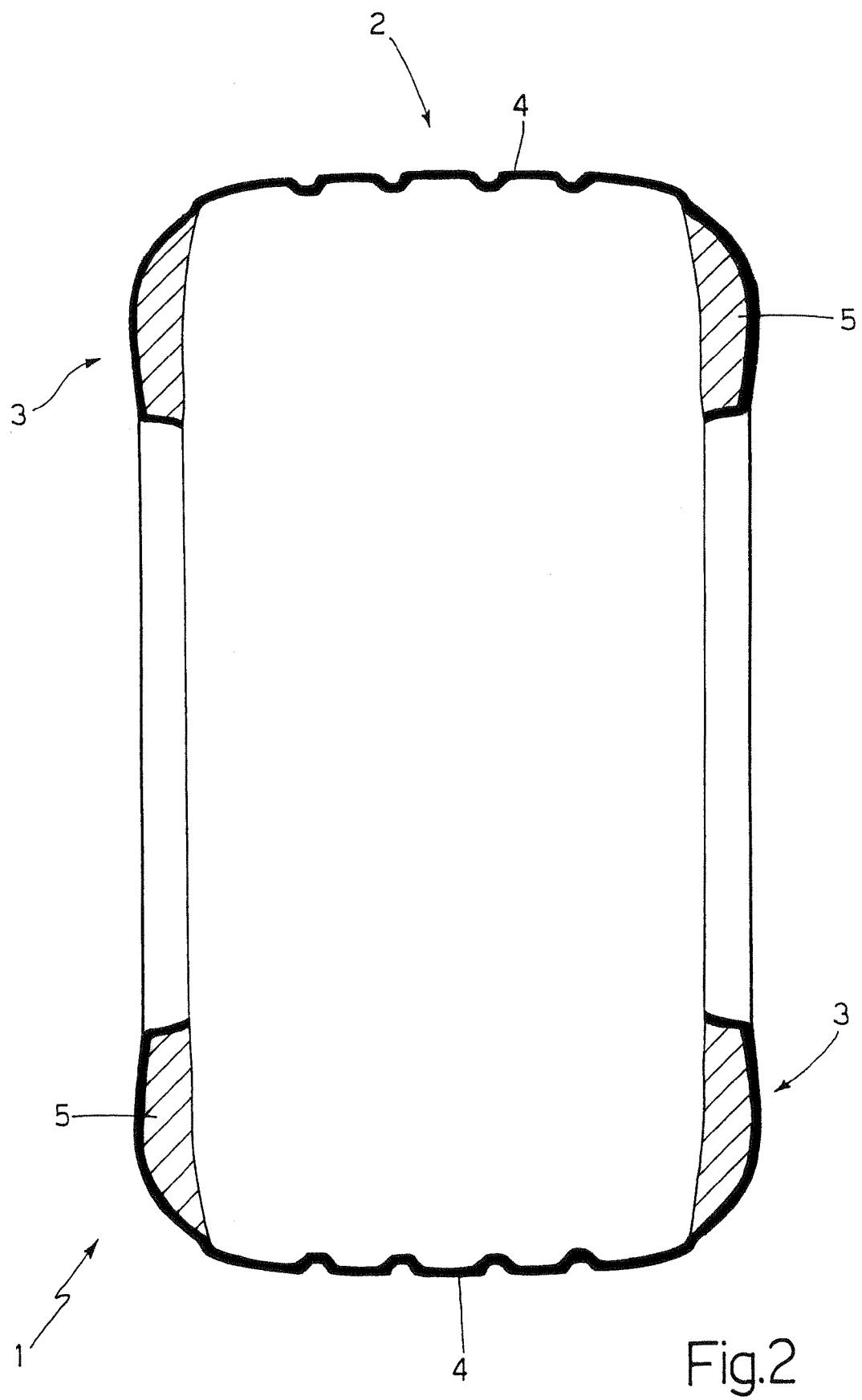
FIG. 2 shows a schematic front cross section of the model of FIG. 1.

According to a preferred embodiment illustrated in FIG. 2, the annular portion 2 has a first substantially constant thickness, whilst each disk-shaped portion 3 has a second variable thickness that is normally greater than the first thickness of the annular portion 2. In particular, the second thickness of the disk-shaped portions 3 is variable between a minimum value at the outer end set in contact with the annular portion 2 and a maximum value at the inner end or in an intermediate portion.

The plastic material used for providing the model 1 can be of different types, for example, polyurethane, PA6, PA11, PA12, HDPE, reticulated HDPE, or else Santoprene® (a thermoplastic elastomer).

In order to reproduce the behaviour of a real tyre it is important for the plastic material with which the model 1 is built to be light in order to limit the deformations induced by the centrifugal force, which, during rotation of the model 1, correspond to a central swelling of the model 1 itself. It should be noted that the deformations induced in the model 1 by the centrifugal force are limited but not negligible; consequently, as has been said previously, it is necessary to take into account said deformations in creating the model 1 in such a way that the external deformed shape of the model 1 itself will correspond exactly to the external shape of the tyre to be imitated.

Furthermore, in order to reproduce the behaviour of a real tyre, it is important for the plastic material with which the model 1 is made to be elastic so as to reproduce the deformations of a real tyre at the area of contact with the road surface without requiring application of a high vertical load on the model 1. In fact, application of a high vertical load on the model 1 is problematic in so far as it increases considerably the wear in loaded conditions of the model 1 and stresses considerably the band belt of the wind tunnel which sets the model 1 in rotation.

Numerous theoretical analyses have shown that the density of the plastic material that constitutes the model 1 must be as low as possible compatibly with the mechanical characteristics of the material (by way of example, the density of the plastic material could be between 0.7 and 1.2 g/cm$^3$). In addition, the modulus of elasticity of the plastic material that constitutes the model 1 must be between 100 and 300 MPa and preferably must be between 150 and 250 MPa.

The sizing of the model 1 obviously depends upon the characteristics of the tyre to be reproduced and can be performed using theoretical calculations, using experimental tests, or, more frequently, using a combination of both of the methodologies.

According to different embodiments, the scale of the model 1 is other than 1:2; for example, the scale of the model 1 could be 1:3 or else 1:4.

According to a first embodiment, in order to obtain the model 1 a toroidal element 4 having the first substantially constant thickness is moulded, then two disk-shaped elements 5 are moulded, and then the two disk-shaped elements 5 are connected to the toroidal element 4 in such a way that the disk-shaped elements 5 are set within the toroidal element 4.

According to different possible embodiments, the toroidal element 4 is moulded independently of the disk-shaped elements 5, and the disk-shaped elements 5 are glued to the toroidal element 4, or else the toroidal element 4 is initially moulded and then the disk-shaped elements 5 are co-moulded together with the first, toroidal, element 4, or else the disk-shaped elements 5 are initially moulded and then the toroidal element 4 is co-moulded together with the disk-shaped elements 5.

It is evident that different techniques for moulding plastic can be used. For example, it would be possible to use rotational moulding using plastic material in the powder form (normally PA or HDPE), injection moulding using granular plastic material (normally PA, HDPE or Santoprene®), or else foam moulding using foamy plastic material (normally polyurethane). It is to be noted that, for reasons of costs and complexity of the equipment necessary, it would be preferable to use rotational moulding or foam moulding rather than injection moulding.

The model 1 described above presents numerous advantages, in so far as it is simple, fast and inexpensive to produce and at the same time enables faithful reproduction in a wind tunnel of the dynamic deformation of a real tyre without being subject to any undesirable vibration or shudder.

The invention claimed is:

1. A reduced scale model of a real tire for aerodynamic tests in a wind tunnel, the model having a hollow toroidal shape, is deformable and has a reduced scale relative to a real tire,
    wherein the model is constituted by a single moulded plastic material homogeneous throughout the model, and
    wherein the model is shaped so as to reproduce externally the deformed shape of the real tire under load when placed in conditions of operation under the action of centrifugal loads and/or ground loads.

2. The model according to claim 1 having in undeformed conditions, a shape different from the shape of the real tire in undeformed conditions.

3. The model according to claim 1, wherein the scale of the model is 1:2.

4. The model according to claim 1, wherein the model has an annular portion representing the tread of the real tire and two disk-shaped portions, which are arranged perpendicular and on opposite sides with respect to the annular portion and represent the sides of the real tire.

5. The model according to claim 4, wherein a first thickness of the annular portion is substantially constant.

6. The model according to claim 4, wherein a second thickness of the disk-shaped portion is variable.

7. The model according to claim 4, wherein a second thickness of the disk-shaped portion is variable between a minimum value at the outer end set in contact with the annular portion and a maximum value.

8. The model according to claim 7, wherein the second thickness of the disk-shaped portion has the maximum value in an intermediate portion.

9. The model according to claim 7, wherein the second thickness of the disk-shaped portion has the maximum value at the inner end.

10. The model according to claim 1, wherein the plastic material has a density of between 0.7 and 1.2 g/cm$^3$.

11. The model according to claim 1, wherein the plastic material has a modulus of elasticity of between 100 MPa and 300 MPa.

12. The model according to claim 11, wherein the plastic material has a modulus of elasticity of between 150 MPa and 250 MPa.

13. The model according to claim 1, wherein the model is not inflated in use.

14. A method for providing a model at a reduced scale of a real tire for aerodynamic tests in a wind tunnel, the model having a hollow toroidal shape, being deformable, having a reduced scale relative to such a real tire, and being made of a single plastic material, which is moulded and is homogeneous throughout the model; the method comprising the steps of:
    moulding a first, toroidal, element having a first substantially constant thickness and representing the tread of the real tire to be imitated;
    moulding two second, disk-shaped, elements having a second variable thickness and representing the sides of the real tire to be imitated; and
    connecting to the first, toroidal, element the second, disk-shaped, elements in such a way that the second, disk-shaped, elements are set within the first, toroidal, element and are arranged perpendicular and on opposite sides with respect to the first, toroidal, element.

15. The method according to claim 14, wherein the first, toroidal, element is moulded independently of the second, disk-shaped, elements, and the second, disk-shaped, elements are glued to the first, toroidal, element.

16. The method according to claim 14, wherein the first, toroidal, element is initially moulded and subsequently the second, disk-shaped, elements are co-moulded together with the first, toroidal, element.

17. The method according to claim 14, wherein the second, disk-shaped, elements are initially moulded, and subsequently the first, toroidal, element is co-moulded together with the second, disk-shaped, elements.

* * * * *